Aug. 26, 1930.  L. J. McMILLIN  1,774,182
VEHICLE DUMPING MECHANISM
Filed Aug. 18, 1927   2 Sheets-Sheet 1
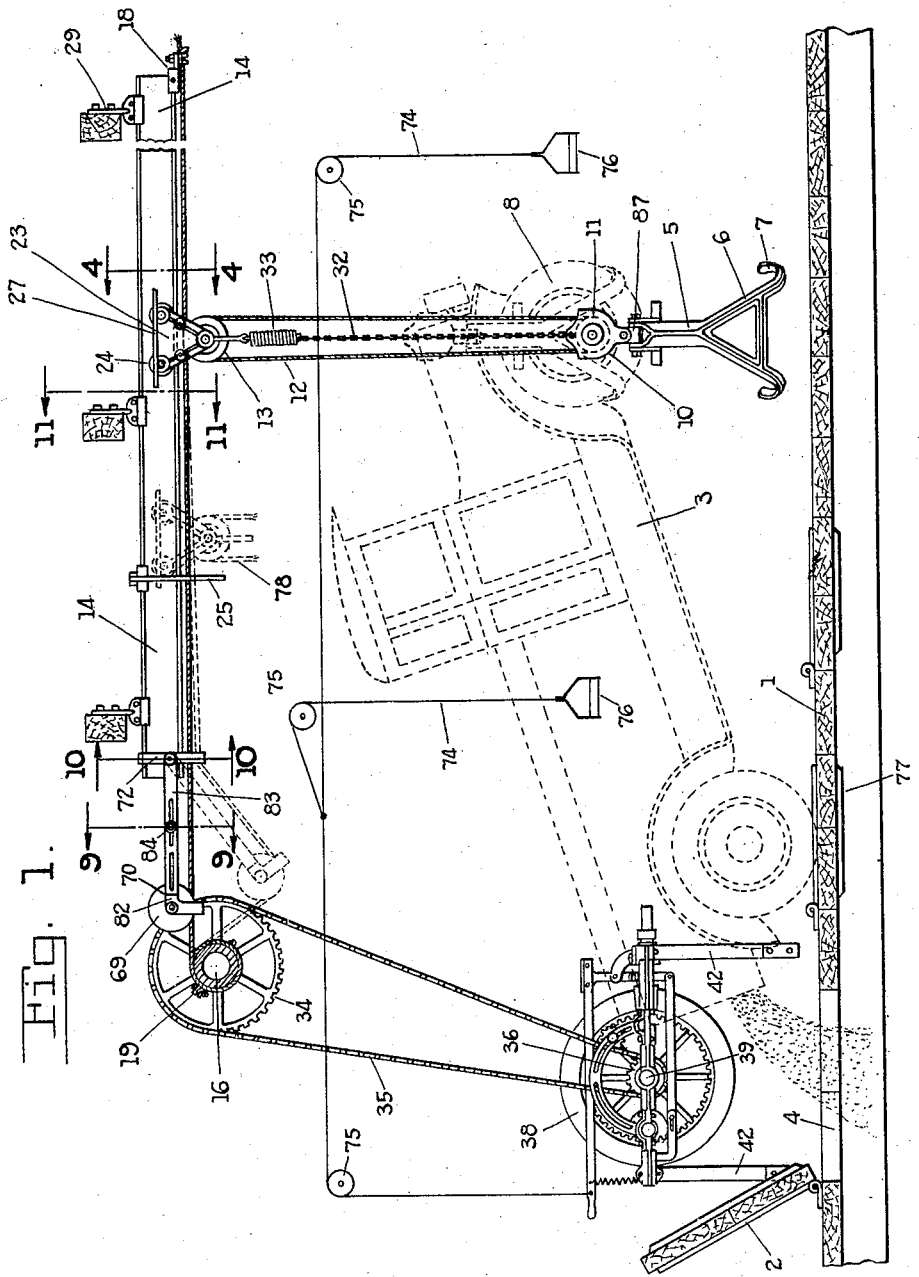
Inventor
LOUIS. J. McMILLIN
By Owen H. Spencer
Attorney

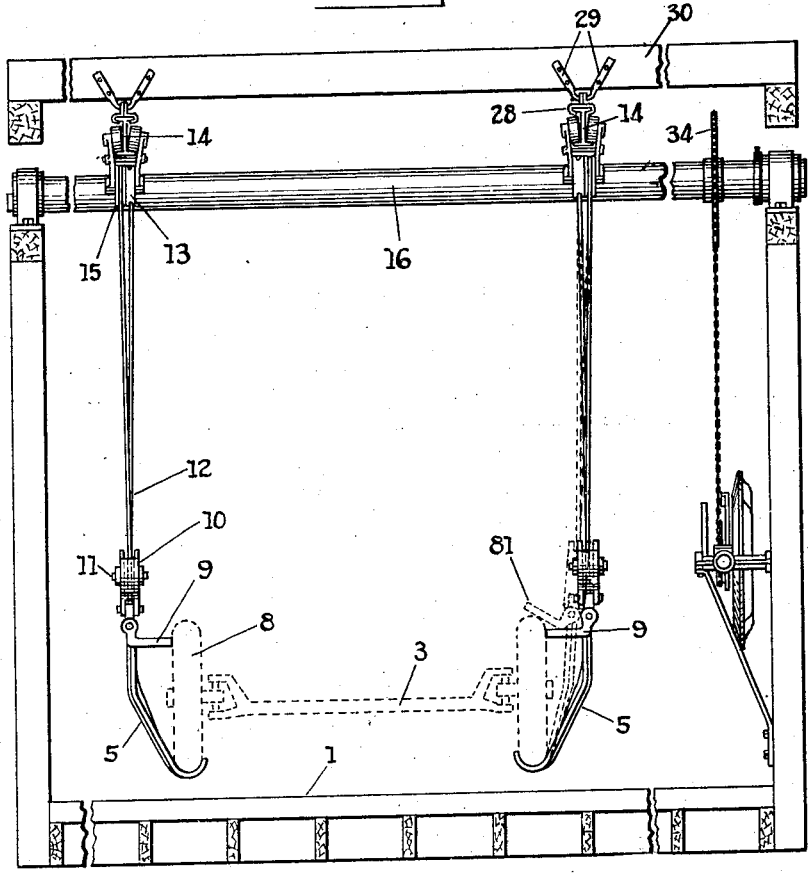

Patented Aug. 26, 1930

1,774,182

UNITED STATES PATENT OFFICE

LOUIS J. McMILLIN, OF INDIANAPOLIS, INDIANA

VEHICLE DUMPING MECHANISM

Application filed August 18, 1927. Serial No. 213,954.

This invention relates to hoisting devices or winches of that class primarily employed for elevating one end of a truck or other vehicle, for causing the contents of the vehicle to discharge therefrom by gravity, and one feature of the invention is the provision of means for engagement with the forward wheels of a vehicle, whereby when lifting action is applied, the forward end of the vehicle will be elevated to the desired degree.

A further feature of the invention is the provision of a carriage and truck structure, whereby the wheel engaging means may be shifted to accommodate the same to vehicles of different lengths and positions.

A further feature of the invention is the provision of means for retaining the wheel engaging means in proper alignment.

Other objects and advantages will be hereinafter more fully set forth and pointed out in the accompanying specification.

In the accompanying drawings which are made a part of this application, Figure 1 is a side elevation of the invention showing a vehicle by dotted lines in tilted position; Fig. 2 is an end elevation thereof.

Referring to the drawings in which similar reference numerals designate corresponding parts thruout the several views, 1 indicates the floor of a building, such as a grain elevator, in which is formed a plurality of trap doors 2, which may be raised when grain or other commodity is to be deposited in a bin or other receptacle.

By providing the trap door 2, a vehicle such as a truck 3 may be driven onto the floor 1 and the contents of the vehicle discharged by gravity thru the door opening 4, and in order to cause all the contents of the vehicle to flow therefrom by gravity, it is necessary to elevate one end of the vehicle or its body, thus causing the contents of the body to discharge from the lowermost end thereof.

Some vehicles are provided with tilting bodies, but in most instances the bodies are fixed to the running gear of the vehicle, necessitating the tilting of the entire vehicle to cause the contents thereof to discharge by gravity; and to this end a pair of grapples 5 are provided, having forked arms 6 thereon, which terminate in hook terminals 7, which terminals engage the tires of the vehicle on opposite sides of the vertical centers of the wheels 8, and in this instance, the forward wheels. Pivoted to the grapples 5, adjacent their upper ends are brace members 9, which, when in lowered position rest against the face of the tire, or spokes of vehicle, depending upon the size of the wheel, at a point substantially vertically above the hub of the wheel, thus retaining the grapples in proper alignment and the wheels against rotation.

Pivotally attached to the top end of each grapple is a block 10, in which is mountel a sheave 11 and passing around such sheave is a cable 12, one end of each cable passing over a sheave 13 and thence outwardly to the outer end of a trackway 14, while the opposite end of the cable passes over a sheave 15 and to a winding shaft 16 at the inner end of the trackway, the sheaves 13 and 15 having guides 17 to prevent the cable passing from one sheave to the other.

The sheaves 13 and 15 are mounted in carriages 23, which carriages have sets of rollers 24 for engagement with the trackways 14. By suspending the cables and grapples in this manner they may be moved lengthwise of the trackways to position the grapples for engagement with the wheels of vehicles of different lengths and thus insuring that the lift on the vehicle will be substantially vertical.

The grapples 5 are limited in their downward movement by means of a chain or the like, 32, in the length of which is interposed a spring 33, said spring yielding sufficiently to permit the hook terminals 7 to pass beneath the tire, when downward pressure is applied on the grapples, but will instantly retract and draw the hooks against the tires when the downward pressure is released therefrom.

The winding shaft 16 is rotated to wind the cables 12 thereon by attaching a sprocket wheel 34 to said shaft, around which extends a sprocket chain 35, said chain extending downwardly and around a sprocket 36 associated with a driving gear 38. The driving gear 38 may be driven by hand or power as may be desired.

The floor 1 may have other doors 77, similar to the door 2 and the truck 3 may be moved so as to dump into same, by correspondingly shifting the carriages 23 along on the tracks 14. The dotted lines 78 indicate another position of said carriage along said tracks.

Referring to Fig. 2 the grapples 5 are more readily applied to the truck wheels 8 by first swinging the brace members 9 up over said wheels as indicated by dotted lines 81, allowing said grapples and the cables 12 to take a correspondingly slackened position. After the grapple hooks 7 have been engaged under said wheels the member 9 is then swung down into place as shown by solid lines.

As before stated the pulley blocks 10 are pivotally attached to the grapples 5. This is carried out by providing a swivel block 87 which connects each of said blocks and grapples by transverse pivot joints, by which arrangement said blocks automatically align themselves in conformity with the vehicle wheel positions, and independently with the alignment of said block. This arrangement greatly adds to the freedom of operation of the apparatus as a whole.

While the description and drawing illustrates in a general way, certain instrumentalities which may be employed in carrying the invention into effect, it is evident that many modifications may be made in the various details, without departing from the scope of the appended claims, it being understood that the invention is not restricted to the particular forms herein described.

I claim as my invention:

1. In a hoisting device a cable structure; a wheel engaging grapple cooperating with said cable and a brace member pivotally mounted on the said grapple and adapted to be swung downwardly into engagement with the side face of the wheel being lifted to hold the upper portion of the grapple away from said wheel or upwardly out of engagement with the side face of the wheel.

2. In a hoisting device for vehicles, a cable structure, a grapple cooperating with said cable structure and adapted to engage parts of a vehicle, a brace member pivoted to said grapple and adapted to be swung downwardly into engagement with the side face of the parts of the vehicle engaged by said grapple, means for normally limiting the downward movement of said grapple, and a yieldable element incorporated in the movement limiting means adapted to yield and permit the grapple to be engaged with parts of the vehicle and the brace member to be moved into or out of operative position.

3. In a hoisting device for vehicles, a cable structure including a block and sheave, said cable being reeved around said sheave, a grapple pivoted to said block and adapted to engage parts of said vehicle, means connected to said block for limiting the normal descent of the block and grapple, and a yielding element interposed in the length of said limiting means, whereby said grapple may be forced to a lower position when being engaged with parts of the vehicle.

4. In a hoisting device for vehicles, a cable structure including a block and sheave, said cable being reeved around said sheave, a grapple pivoted to said block adapted to engage parts of the vehicle, a chain attached to said block, and a spring interposed in the length of said chain whereby said grapple may be additionally lowered beyond the normal length of said chain when desired.

5. In a hoisting device for vehicles, a grapple for engaging parts of the vehicle, a block pivoted to said grapple, runs of a cable extending around said block, a chain attached to said block between the cable runs, and a spring interposed in the length of said chain, whereby said grapple may be additionally lowered beyond the normal length of said chain when desired.

In testimony whereof, I have hereunto set my hand on this the 15th day of August, 1927, A. D.

LOUIS J. McMILLIN.